United States Patent [19]

Franzl

[11] 3,827,401
[45] Aug. 6, 1974

[54] SANITARY RECEPTACLE FOR PETS

[76] Inventor: Gertrude K. Franzl, 105-25 65th Ave., Forest Hills, N.Y. 11375

[22] Filed: Oct. 16, 1972

[21] Appl. No.: 297,589

[52] U.S. Cl. ............................................ 119/1, 4/1
[51] Int. Cl. ............................................ A01k 29/00
[58] Field of Search ............... 4/6, 7, 10, 1; 119/1

[56] References Cited
UNITED STATES PATENTS

| | | | |
|---|---|---|---|
| 2,750,600 | 6/1956 | MacDonald | 4/113 |
| 3,233,588 | 2/1966 | Thomas | 119/1 |
| 3,246,630 | 4/1966 | Dearing et al. | 119/1 |
| 3,284,273 | 11/1966 | Prentice | 119/1 X |
| 3,332,397 | 7/1967 | Vander Wall | 119/1 |
| 3,358,647 | 12/1967 | Wilson | 119/1 |
| 3,377,990 | 4/1968 | Mitchell | 119/1 |
| 3,386,417 | 6/1968 | Machowski | 119/1 |
| 3,416,495 | 12/1968 | Wilson | 119/1 |
| 3,476,083 | 11/1969 | Vander Wall | 119/1 |

*Primary Examiner*—Henry K. Artis
*Attorney, Agent, or Firm*—John J. Posta, Jr.

[57] ABSTRACT

An improved sanitary animal toilet is provided which includes an open topped, hollow self-supporting basin, a porous horizontal platform removably disposed in the basin above its lower end, a porous skid resistant mat removably disposed on the platform and a sheet of disposable porous paper or the like positioned on the mat. The sheet traps feces, while the mat and drainboard allow urine to pass to a drain in the basin below the platform. A basin liner and basin enclosure, the latter for male animals, can also be provided. The basin can be made inflatable for easy use. A carrying or storage case is provided for each model of the receptacle.

12 Claims, 8 Drawing Figures

PATENTED AUG 6 1974 3,827,401

PATENTED AUG 6 1974

SANITARY RECEPTACLE FOR PETS

BACKGROUND OF THE INVENTION

A. Field of the Invention

The present invention generally relates to toilets and more particularly to those for use by animals.

B. Description of Prior Art

Animal toilets usually are constructed to attach to human toilets or are merely litter boxes. The type which attaches to toilets is relatively expensive and complicated and obviously renders that facility unusable by humans while so attached. Moreover, it requires that the animal be lifted and held in place, an action which very often inhibits the animal from using the facility.

The litter box type of animal toilet, while eliminating such drawbacks, still is of considerable inconvenience, since the animal usually scratches litter out on the floor surrounding the box and since the litter must be changed frequently to prevent build-up of noxious odors and development of generally unsanitary conditions. The used litter presents a problem of disposal, because of its odor, weight and granular nature, and new litter of considerable bulk and weight must frequently be brought in to replace used litter.

While it is recognized that animal toilets theoretically are a great convenience for owners of animals, such as house pets, in practice, conventional animal toilets do not satisfy the need for sanitary, convenient yet efficient animal waste disposal. Accordingly, there is a need to provide an animal toilet which can be made inexpensively, which is adaptable to a wide variety of sizes and types of animals, which can be used by the animal without human assistance and which is highly sanitary, compact, convenient and, when desired, portable.

SUMMARY OF THE INVENTION

The improved animal toilet of the present invention satisfies all of the foregoing needs. The toilet of the present invention is substantially as set forth in the abstract above. The components of the present animal toilet are easily assembled and disassembled, replaced, cleaned and stored. Moreover, the toilet can be made highly portable, and pursuant thereto, a storage and carrying case is provided therewith. Special shielding means can be included when the animal using the same is a male. Drain means are provided for immediate disposal of urine, and easily replaceable and disposable means are provided for sanitarily removing feces as they accumulate.

Further features of the invention are as set forth in the following detailed description and drawings.

DESCRIPTION OF THE PREFERRED EMBODIMENT

FIRST EMBODIMENT — FIGS. 1 AND 2

Figure 1:
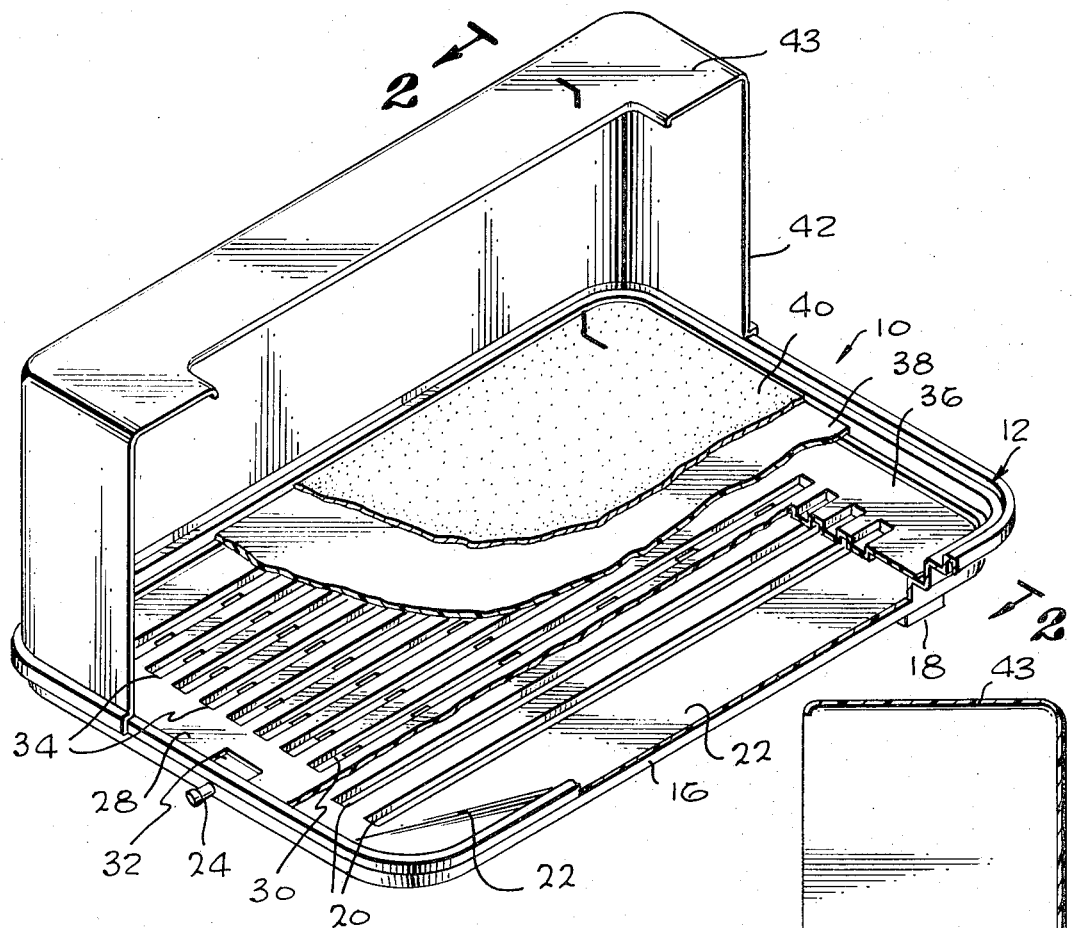
FIG. 1 is a perspective view, partly broken away, of a first preferred embodiment of the animal toilet of the invention.
Figure 2:
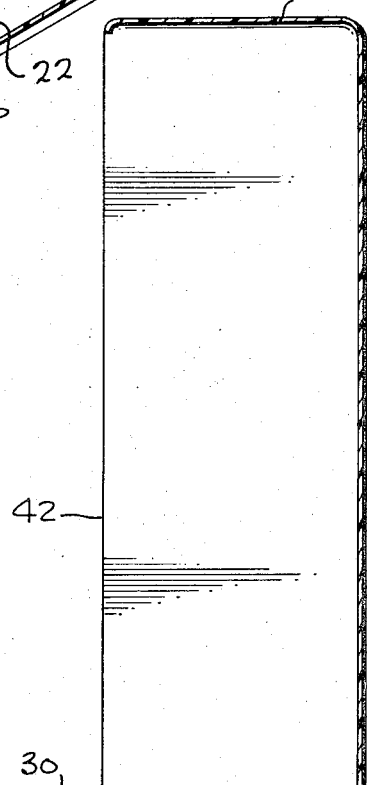
FIG. 2 is a sectional view taken along lines 2—2 of FIG. 1.
Figure 2:
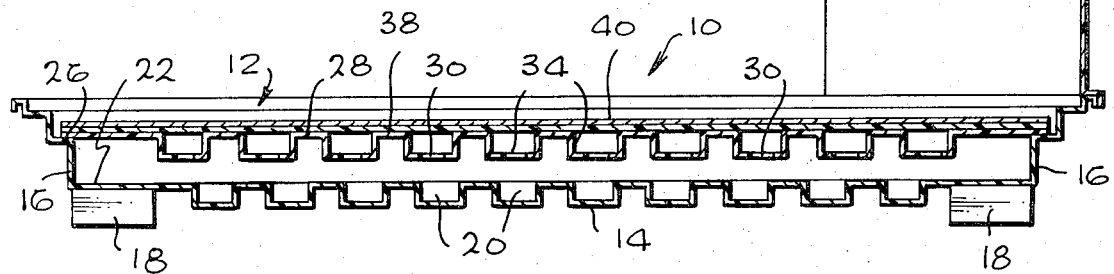

A first embodiment of the animal toilet of the invention is shown in FIGS. 1 and 2. Thus, toilet 10 comprises an open-topped, hollow, self-supporting basin 12 having a closed lower end or bottom 14 and upstanding sidewalls 16. Basin 12 can be, as shown in FIG. 1, rectangular or can be square, round, or of any other desired shape. It is durable, washable and attractive in appearance and can be fabricated of any suitable material, such as colored plastic, metal, fiberglass or the like. Moreover, it can be made in any size to accommodate the smallest or the largest of the usual types of household pets.

Basin 12 includes a plurality of spaced, vertical, non-skid support legs secured to the underside of bottom 14. Basin 12 further includes a plurality of spaced parallel drain troughs 20 disposed in the upper surface 22 of bottom 14, which surface 22 preferably is pitched down along the longitudinal axis of ridges 20 to a closable drain cock 24 extending through a side wall 16.

Basin 12 further includes an inwardly directed horizontally aligned peripheral support ledge 26 positioned at a suitable distance above bottom 14 and dimensioned to releasably and horizontally support a drainboard 28 as shown in FIG. 1. Drainboard 28 can be fabricated of any suitable material, such as that described for basin 12, and is strong, self-supporting and porous, due to spaced perforations 30 extending vertically down therethrough to permit urine to pass to surface 22 for removal through drain cock 24.

Drainboard 28 must be capable of supporting the weight of the animal using toilet 10 and yet must be light enough to be easily removed from basin 12, as by handle means such as pick-up holes 32 therein. Drainboard 28 may be provided with a plurality of drain troughs 34 or the like which cooperate with perforations 30 in rapidly channeling urine to surface 22.

Disposed on the upper surface 36 of drainboard 28 is a skid, claw and splash resistant, durable, washable but porous mat 38 fabricated of porous foam rubber, fiberglass, plastic or the like. Mat 38 is reusable and can be readily cleaned. It is used to keep drainboard 28 sanitary while providing the desired surface characteristics, including, preferably, some resiliency. Mat 38 allows urine to pass readily therethrough to drainboard 28 for removal to drain cock 24, as previously described.

Mat 38 is, in turn, held free of feces by application to the upper surface thereof of a thin disposable sheet 40 of porous material, such as paper or the like, which can be easily discarded after use. For this purpose, it is preferred to select material which will be readily water disintegratable so that it can be flushed down a conventional toilet without stopping it up. Many suitable cellulosic papers are commercially available for such use, and have the added advantage of being very inexpensive. When animal feces are deposited on sheet 40, sheet 40 is removed from the upper surface of mat 38 and is disposed of, and a new sheet 40 is placed on mat 38. Thus, toilet 10 is kept sanitary. Sheet 40 can also be removed and replaced whenever soiled by urine, so as to provide a sanitary exposed upper surface for toilet 10.

After the components of toilet 10 are assembled into the configuration shown in FIG. 1, toilet 10 is ready for use. Thus, an animal can be placed on sheet 40. Upon use of suitable inducements, rewards, etc., the animal is soon trained to use toilet 10 by itself. Whenever convenient, sheet 40 can be changed and basin 12 can be drained at suitable intervals through cock 24. Mat 38, drainboard 28 and basin 12 can be cleaned as needed. Accordingly, toilet 10 is simple, inexpensive, yet novel, highly effective and sanitary.

Also as shown in FIG. 1, toilet 10 may be provided with a basin enclosure 42 along one or more sides of basin 12 and extending upwardly therefrom. Enclosure 42 is releasably secured to the upper end of one or more sidewalls 16 by suitable means (not shown) and is preferably fabricated of plastic or other easily cleanable durable material, such as that used for basin 12. It can be of any suitable size and shape, consistent with the requirement that it permit urine from a male animal which lifts its leg when urinating to be directed to one or more of the previously described components within basin 12 without allowing escape of such urine from basin 12 except through drain cock 24. Enclosure 42 can include an inwardly directed upper end portion 43, if desired. Obviously, if toilet 10 is to be used only by animals which do not urinate in such fashion, enclosure 42 can be eliminated.

SECOND EMBODIMENT — FIGS. 3 AND 4

Figure 3:
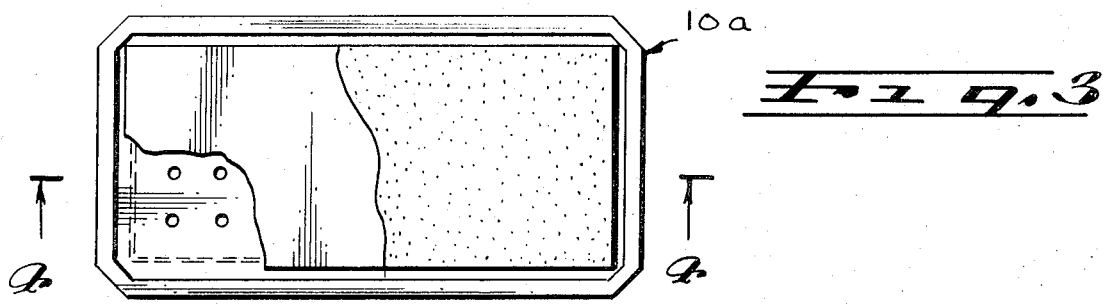
FIG. 3 is a schematic top plan view, partly broken away, of a second preferred embodiment of the animal toilet of the invention.

In the embodiment shown in FIG. 3 in top plan view, a toilet 10a is provided which is similar to toilet 10, and like components bear identical numerals succeeded by the letter "a." Toilet 10a, however, is adapted to be incorporated in a tub or the like, such as a bath tub. In this regard, basin 12a comprises a tub with a bottom 14a, sidewalls 16a, surface 22a and drain 24a.

In order to facilitate cleaning of basin 12a, an easily removable, strong but thin liner 44 fabricated of any suitable material such as plastic, wood, metal, fiberglass or the like, is disposed within basin 12a, with the upper periphery 16 of liner 44 overlying the upper edges of sidewalls 16a.

Figure 4:
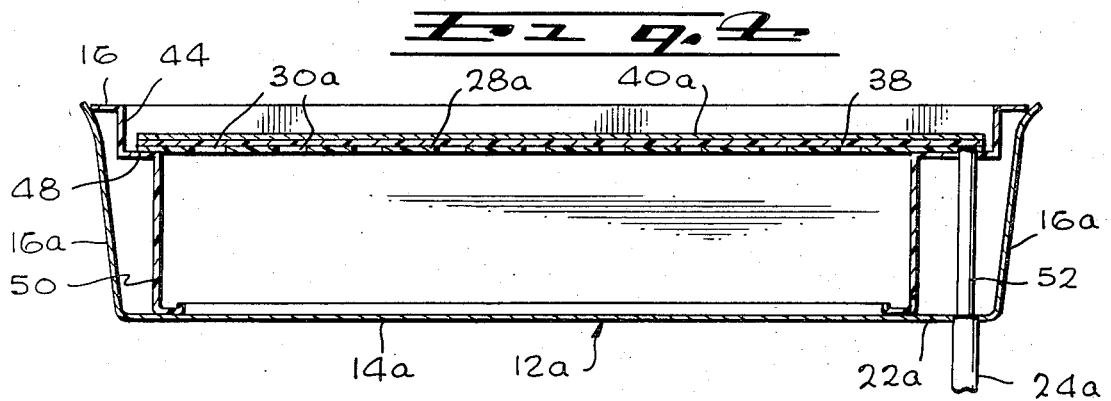
FIG. 4 is a sectional view taken along lines 4—4 of FIG. 3.

Liner 44 includes an inwardly directed horizontally disposed peripheral ledge 48 located above surface 22a in sidewalls 50 thereof as shown in FIG. 4, and a drain line 52 communicating between surface 48 and drain 24a. If desired, liner 44 can be provided with a self-adhering edge. Ledge 48 releasably retains drainboard 28a which contains a plurality of spaced vertical perforations 30a extending therethrough into communication with basin 12a and surface 22a.

Mat 38a is disposed on drainboard 28a and sheet 40a is disposed on the top of mat 38a, in the manner previously described for drainboard 28, mat 38 and sheet 40. An animal using toilet 10a deposits feces on sheet 40a while its urine passes down through sheet 40a, mat 38a and drainboard 28a into contact with surface 22a for removal through drain 24a or its equivalent. Urine also travels down drain line 52 into drain 24a, as shown in FIG. 4. Sheet 40a is easily replaced and mat 38a, drainboard 28a and liner 44 are easily removed and cleaned. Accordingly, an existing tub or other basin with drain can be readily incorporated into toilet 10a for improved results.

THIRD EMBODIMENT — FIGS. 5, 6, 7 AND 8

Figure 5:
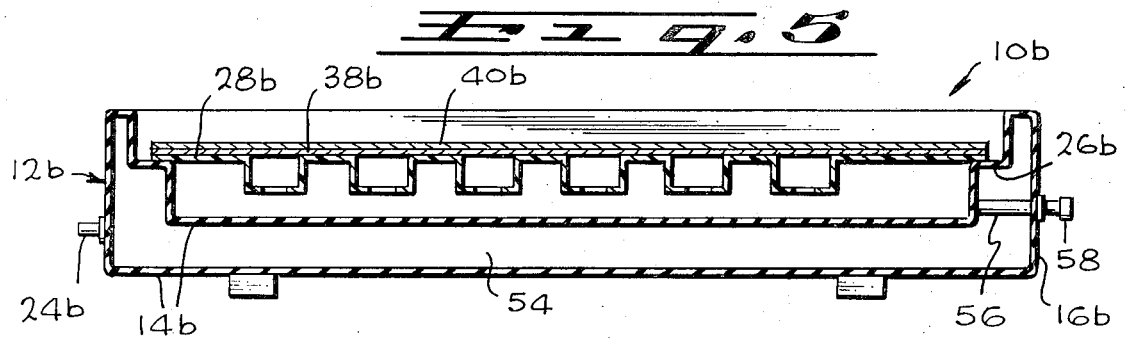
FIG. 5 is a sectional view of a third preferred embodiment of the animal toilet of the invention.
Figure 6:
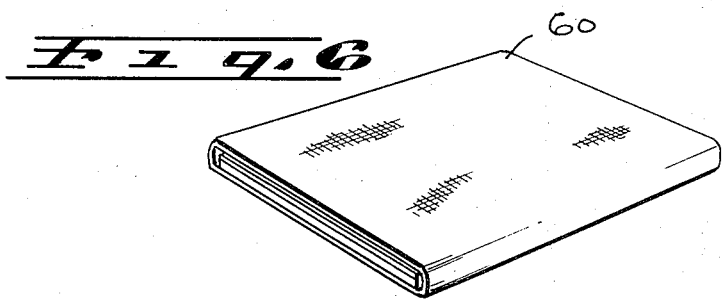
FIG. 6 is a perspective view of a carrying case for the invention.

FIGS. 5 and 6 depict a third embodiment of the present invention in a cross-sectional view. Thus, a toilet 10b is shown, with components similar to those of either the first or the second embodiments bearing the same numerals succeeded by the letter "b."

Toilet 10b includes a basin 12b of general configuration similar to that of basin 12, but fabricated of an inflatable material. Thus, for example, an elastomeric material can be used for basin 12b to provide between outer and inner bottom walls 14b and sidewalls 16b an airspace 54. Airspace 54 communicates through walls 16b with inflating means in the form of a hollow tube 56 with releasable clamp means 58.

Basin 12b in the inflated state, as shown in FIG. 5, is provided with ledge 26b. Basin 12b also includes drain cock 24b. On ledge 26b are releasably disposed in stacked relation drainboard 28b, mat 38b and sheet 40b. Toilet 10b can also be equipped with a basin enclosure such as the basin enclosure 42 shown in FIG. 1, which can be releasably secured to a sidewall 16b of basin 12b to extend upwardly therefrom a sufficient distance to direct male animal urine to basin 12b. Such enclosure can be fabricated of any suitable material, such as plactic or the like.

Figure 7:
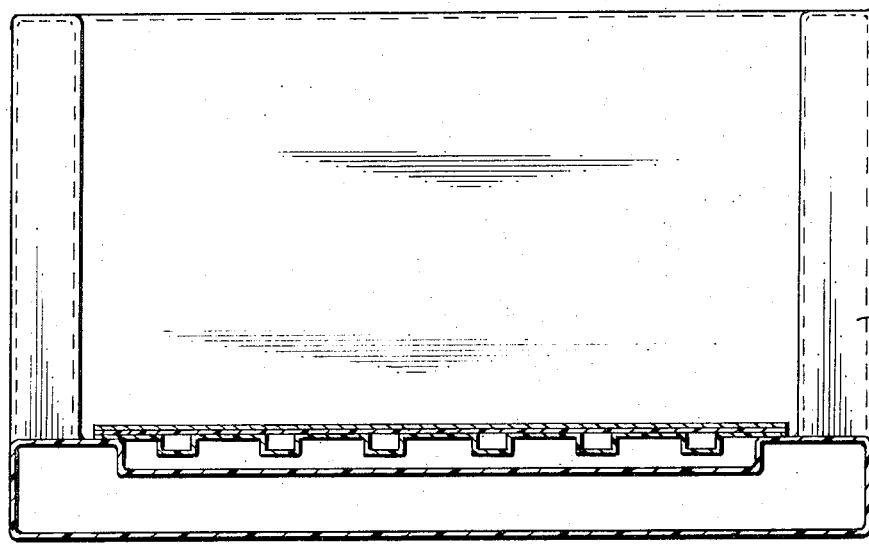
FIG. 7 is a sectional side view of an inflated animal toilet.
Figure 8:
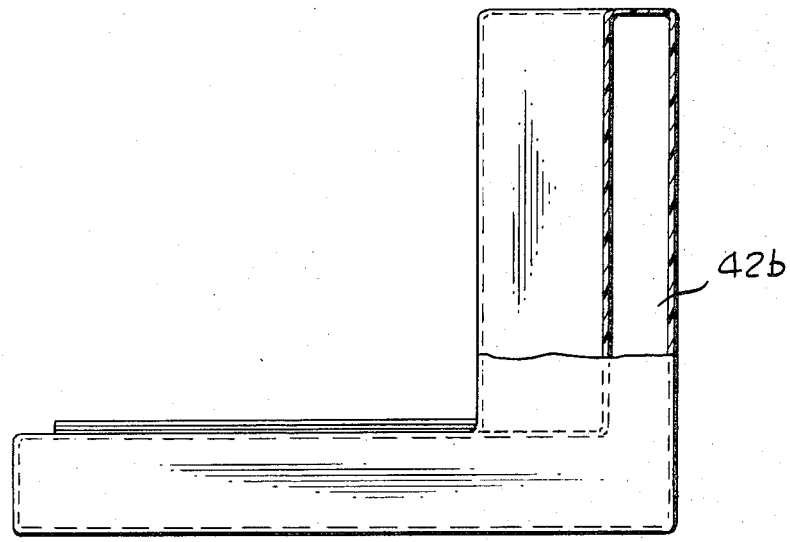
FIG. 8 is another side elevational view with a cutaway section of the animal toilet.

Alternatively, as shown in FIGS. 7 and 8, one can provide the inflated model which has a basin enclosure 42b integral therewith. This design would be used for male animals who lift their leg when urinating.

As shown in FIG. 6, toilet 10b is provided with a storage and carrying case 60 adapted to receive basin 12b in the collapsed (deflated state), platform 28b, mat 38b and sheet 40b. Accordingly, toilet 40b is highly portable. Similarly, carrying cases (not shown) can be provided for the receptacle units shown respectively in FIGS. 1–2 and FIGS. 3–4. It can be set up rapidly when needed for removing it from case 60, inflating basin 12b through tube 56 and clamping it off by clamp 58, then installing drainboard 28b, mat 38b and sheet 40b to complete the assembly. It is then ready for use in the previously described manner.

Accordingly, an improved animal toilet is provided which is highly adaptable, sanitary, inexpensive, durable and easy to clean, store and maintain. Various modifications and changes can be made in the same and in components thereof. All such modifications and changes as are written in the scope of the appended claims form part of the present invention.

What is claimed and desired to be secured by Letters Patent is:

1. An improved animal toilet, which comprises:
   an open topped, hollow, self-supporting basin having a closed lower end and upstanding sidewalls;
   a generally horizontally extending porous removable drainboard supported by said basin;
   a porous mat removably disposed on said drainboard; and
   a thin liquid-permeable disposable sheet removably positioned on said mat.

2. The improved animal toilet of claim 1 wherein at least one of said basin and drainboard defines handle means, wherein said basin and drainboard are each washable and waterproof, and wherein said mat is skid and splash resistant, washable removable and puncture resistant, and wherein said sheet is water disintegratable so that it can be flushed down a conventional toilet.

3. The improved animal toilet of claim 2 wherein said basin and drainboard comprise durable plastic, wherein said drainboard includes drain troughs and perforations, wherein said mat comprises fiberglass and said sheet comprises paper which is water disintegratable so that it can be flushed down a conventional toilet, and wherein a removable plastic liner is disposed within said basin between said basin and said drainboard, mat and sheet.

4. The improved animal toilet of claim 2 wherein said basin includes a plurality of spaced generally vertical support legs extending from the underside thereof, a plurality of drain troughs in the upper surface of the lower end thereof and a drain cock, wherein said upper surface is pitched down to said drain cock to facilitate draining and wherein said basin includes a platform-supporting ledge along the inner periphery of said sidewalls.

5. The improved animal toilet of claim 1 wherein said basin comprises a tub, wherein a removable plastic liner is disposed within said basin between said basin and said drainboard, mat and sheet and wherein said liner includes drain means connectable to drain means of said tub.

6. The improved animal toilet of claim 5 wherein at least one of said liner and drainboard defines handle means, wherein said liner and drainboard are washable and waterproof and wherein said mat is skid and splash resistant, washable, reusable and puncture resistant, and wherein said sheet is water disintegratable so that it can be flushed down a conventional toilet.

7. The improved animal toilet of claim 6 wherein said liner and drainboard comprise durable plastic, said mat comprises fiberglass and said sheet comprises paper, and wherein said sheet is water disintegratable so that it can be flushed down a conventional toilet.

8. The improved animal toilet of claim 1 wherein said basin is inflatable and defines an internal air space, wherein inflating means extend from said air space to the exterior of said basin, wherein said basin and drainboard are each washable and waterproof, wherein said mat is skid and splash resistant, washable and puncture resistant and wherein said basin includes urine drain means.

9. The improved animal toilet of claim 8 wherein said basin comprises an elastomeric material wherein said sheet comprises water disintegratable paper which can be flushed down a conventional toilet, wherein said drainboard comprises plastic and said mat comprises fiberglass and wherein drainboard, mat and sheet are disposable.

10. Th improved animal toilet of claim 1 wherein said toilet includes a basin enclosure releasably secured to said basin along at least one side thereof and extending upwardly therefrom for use by male animals.

11. The improved animal toilet of claim 8 wherein an enclosure is provided which is releasably secured to said basin and which is adapted to serve as a splash guard for animals who raise their leg while urinating.

12. The improved animal toilet of claim 8 wherein an inflatable enclosure is provided which is integral with the basin and which is adapted to serve as a splash guard for animals who raise their leg while urinating.

* * * * *